United States Patent
McKee et al.

(10) Patent No.: US 8,005,009 B2
(45) Date of Patent: Aug. 23, 2011

(54) METHODS AND COMPUTER PROGRAMS FOR GENERATING DATA TRAFFIC MATRICES

(75) Inventors: Neil McKee, Berkeley, CA (US); Peter Phaal, San Francisco, CA (US)

(73) Assignee: InMon Corp., San Francisco, CA (US)

(*) Notice: Subject to any disclaimer, the term of this patent is extended or adjusted under 35 U.S.C. 154(b) by 1212 days.

(21) Appl. No.: 10/877,853

(22) Filed: Jun. 25, 2004

(65) Prior Publication Data

US 2005/0286434 A1    Dec. 29, 2005

(51) Int. Cl.
H04L 12/26 (2006.01)
(52) U.S. Cl. .................. 370/253; 370/230.1; 370/254
(58) Field of Classification Search .............. 370/235, 370/229, 230, 231.1, 241, 230.1, 253, 468, 370/231, 252, 254, 395.21; 709/224
See application file for complete search history.

(56) References Cited

U.S. PATENT DOCUMENTS

| | | | |
|---|---|---|---|
| 5,615,323 A | 3/1997 | Engel et al. | |
| 5,790,799 A | 8/1998 | Mogul | |
| 6,085,243 A | 7/2000 | Fletcher et al. | |
| 6,529,475 B1 | 3/2003 | Wan et al. | |
| 6,771,646 B1* | 8/2004 | Sarkissian et al. | 370/392 |
| 6,934,249 B1* | 8/2005 | Bertin et al. | 370/218 |
| 7,028,088 B1* | 4/2006 | Koperda et al. | 709/229 |
| 7,139,274 B2* | 11/2006 | Attar et al. | 370/395.4 |
| 7,164,657 B2 | 1/2007 | Phaal | |
| 7,197,008 B1* | 3/2007 | Shabtay et al. | 370/218 |
| 7,209,434 B2* | 4/2007 | Kano et al. | 370/216 |
| 7,257,081 B2* | 8/2007 | Rajan et al. | 370/231 |
| 7,478,156 B1* | 1/2009 | Pereira | 709/224 |
| 7,486,696 B2 | 2/2009 | Garg et al. | |
| 2003/0048749 A1* | 3/2003 | Stamatelakis et al. | 370/225 |
| 2003/0128710 A1* | 7/2003 | Fedyk et al. | 370/400 |
| 2003/0198190 A1* | 10/2003 | Rajan et al. | 370/252 |
| 2004/0190444 A1* | 9/2004 | Trudel et al. | 370/224 |
| 2004/0213155 A1* | 10/2004 | Xu et al. | 370/232 |
| 2005/0111367 A1 | 5/2005 | Chao et al. | |

OTHER PUBLICATIONS

Claffy, K.C., et al., "Application of Sampling Methodologies to Network Traffic Characterization," Computer Systems Laboratory, pp. 1-10.
Brownlee, N., "Traffic Flow Measurements: Meter MIB," Network Working Group, The University of Aukland, Jan. 1997, pp. 1-38.
U.S. Appl. No. 12/492,703, filed Jun. 26, 2009, Phaal.

(Continued)

*Primary Examiner* — Ricky Ngo
*Assistant Examiner* — Chandrahas Patel
(74) *Attorney, Agent, or Firm* — Kilpatrick Townsend & Stockton LLP; Ardeshir Tabibi (57) ABSTRACT

A method and system for monitoring traffic flow includes assigning a subset of sampling points to a node or unique pair of nodes. The sampling points are determined to be the most likely to monitor data traffic, and preferably all data traffic, associated with the node or node pair. The sampling point subset may automatically be determined and assigned to the node or node pair, based, for example, on historical traffic within the network. The method further includes collecting diagnostic network traffic data from the sampling points, and obtaining sampled traffic flow counts for a flow associated with a node pair from the diagnostic traffic data collected from the sampling points assigned to the source and destination nodes of the node pair. The method further includes performing a function on the sampled traffic flow counts to obtain an estimated traffic flow count for the respective flow.

56 Claims, 6 Drawing Sheets

OTHER PUBLICATIONS

Phaal, U.S. Appl. No. 12/946,102, Network Traffic Optimization, filed on Nov. 15, 2010.

Non-Final Office Action for U.S. Appl. No. 12/492,703, mailed on Nov. 24, 2010, 9 pages.

* cited by examiner

| ASSIGNMENT LUT | |
|---|---|
| A | 1, 2, 3 |
| B | 20, 21 |
| C | 7 |

| SOURCE ASSIGNMENT LUT | |
|---|---|
| A | 1, 3 |
| B | 20 |
| C | 7 |

108

| DESTINATION ASSIGNMENT LUT | |
|---|---|
| A | 1, 2, 3 |
| B | 21 |
| C | 7 |

| ASSIGNMENT LUT | |
|---|---|
| AA | - |
| AB | 1, 2, 3, 4, 10, 12, 15, 20, 21 |
| AC | 1, 2, 3, 4, 6, 7 |
| BA | 1, 2, 3, 4, 10, 11, 17, 19, 20, 21 |
| BB | 21 |
| BC | 7, 8, 14, 16, 20, 21 |
| CA | 1, 2, 3, 4, 6, 7 |
| CB | 7, 8, 12, 13, 15, 20, 21 |
| CC | 7 |

METHODS AND COMPUTER PROGRAMS FOR GENERATING DATA TRAFFIC MATRICES

FIELD OF THE INVENTION

The present invention relates to methods and apparatus for monitoring data on networks, and in particular, monitoring the flow of data in packet-switched networks.

BACKGROUND OF THE INVENTION

Traffic monitoring is a vital element of network and system management. Traffic monitoring used to be a relatively straightforward task. In the past, many machines were connected to a single shared network, and a single instrument connected to the network could monitor all of the traffic. Requirements for increased bandwidth, changes in traffic patterns, and the quickly falling price of packet switching and routing devices, however, has caused a rapid movement away from shared networks to networks that are highly segmented. The challenge is to monitor traffic on these segmented networks.

Figure 1:
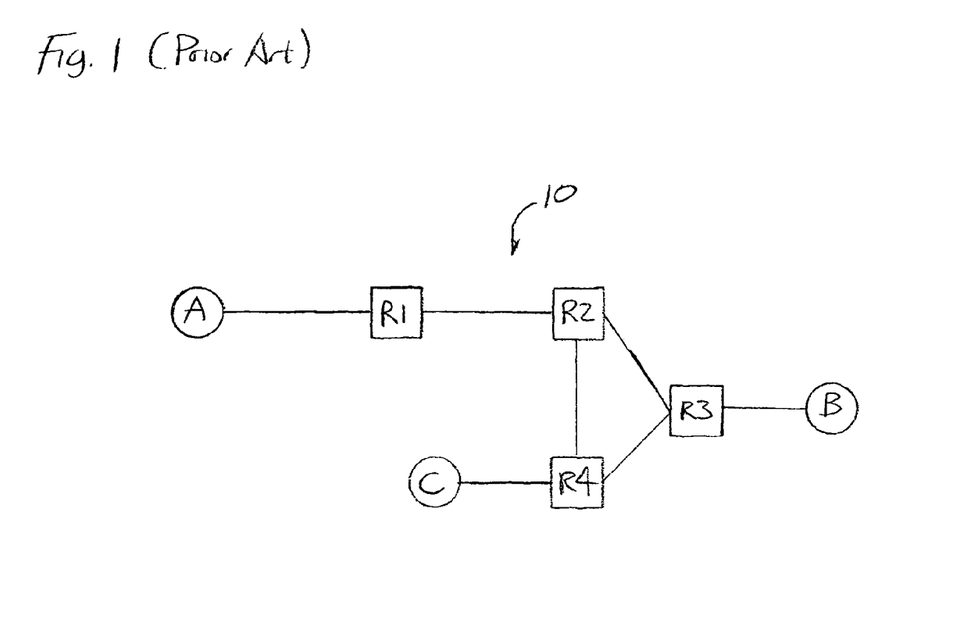
FIG. 1 is a functional block diagram of a prior art packet-switched network.
Figure 2:
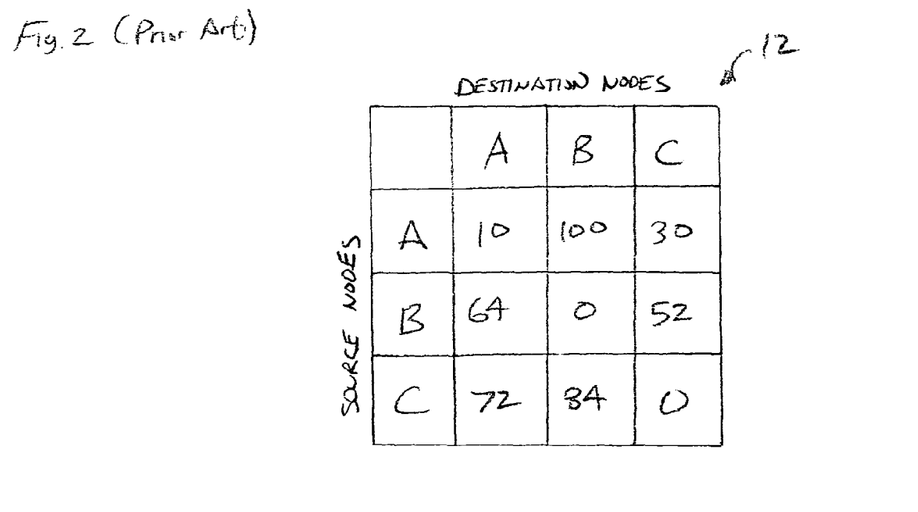
FIG. 2 is an exemplary data traffic matrix for the network of FIG. 1.

One measurement that has become vital to network monitoring is the volume of traffic exchanged between nodes in a network. Such measurements are used for a wide variety of applications, including capacity planning, congestion monitoring, security analysis, and accounting/billing. For any given network, these measurements can be taken over every node permutation on the network to create a traffic matrix. For example, FIG. 1 illustrates a simple network 10 that contains nodes A, B, and C, which are capable of communicating with each other through any combination of Routers R1, R2, R3, and R4. As can be seen in FIG. 2, a traffic matrix 12 containing traffic flow counts is provided, each of which is associated with a unique pair of nodes. For example, a unique node pair can include nodes A and B, with node A being a source node and node B being a destination node (in which case, the traffic flow count would be 100, as shown in the example of FIG. 2), or nodes B and A, with node B being a source node and node A being a destination node (in which case, the traffic flow count is 64, as shown in the example of FIG. 2). Notably, it is a possible for a particular node to communicate with or through itself, e.g., when the node represents a subset of end nodes. For example, a unique node pair can include node A as being both a source node and a destination node (in which case, the traffic flow count is 10, as shown in the example of FIG. 2).

Figure 3:
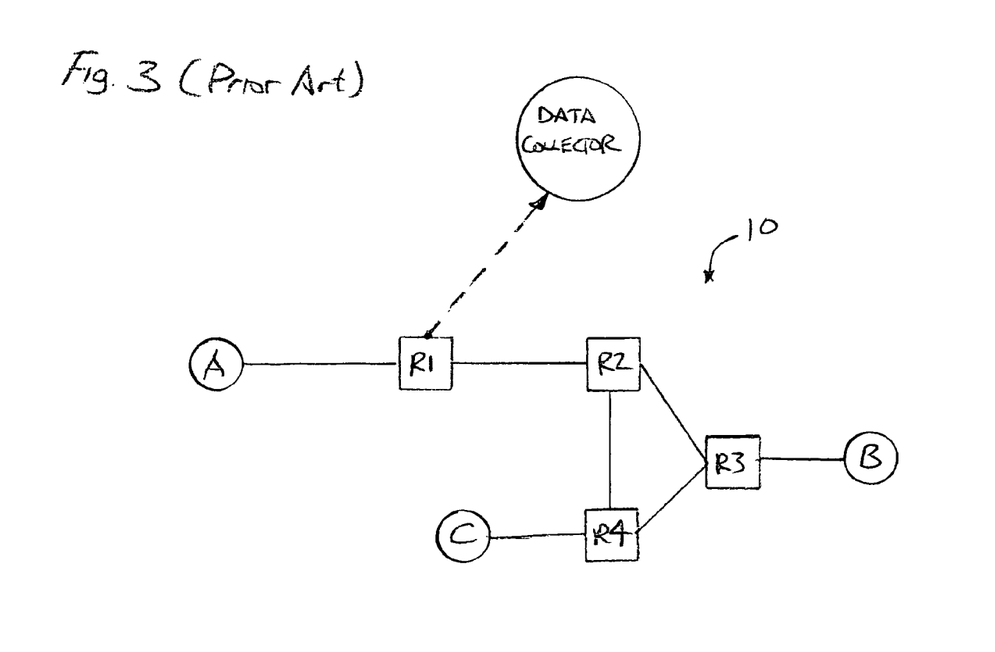
FIG. 3 is a functional block diagram of a prior art packet-switched network having a single sampling point.
Figure 4:
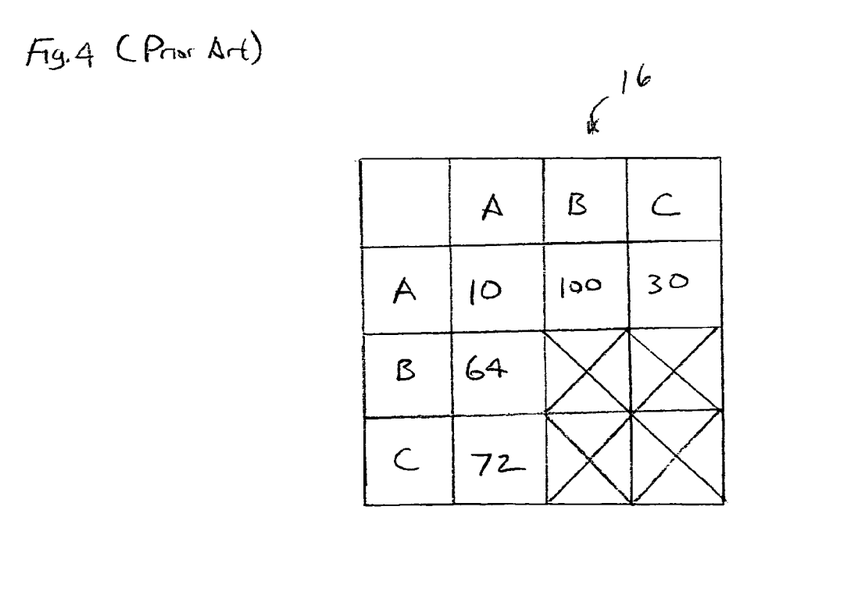
FIG. 4 is an exemplary data traffic matrix that can be generated from data monitored at the sampling point of the network of FIG. 3.

Although, in theory, the generation of a network traffic matrix is simple, its practical implementation is difficult to accomplish in an accurate manner. For example, as shown in FIG. 3, a data collector 14 can collect data from a single monitoring point located at Router 1 adjacent to node A. Since the monitoring point at Router 1 observes all of the traffic in and out of node A, the number of data packets transmitted from node A to nodes B and C, and the number of data packets transmitted from nodes B and C to node A, can be monitored. Because the monitoring point at Router 1 seldom or never monitors the data traffic in and out of nodes B and C, however, the number of data packets transmitted between nodes B and C is not known, resulting in the incomplete traffic matrix 16 illustrated in FIG. 4.

Figure 5:
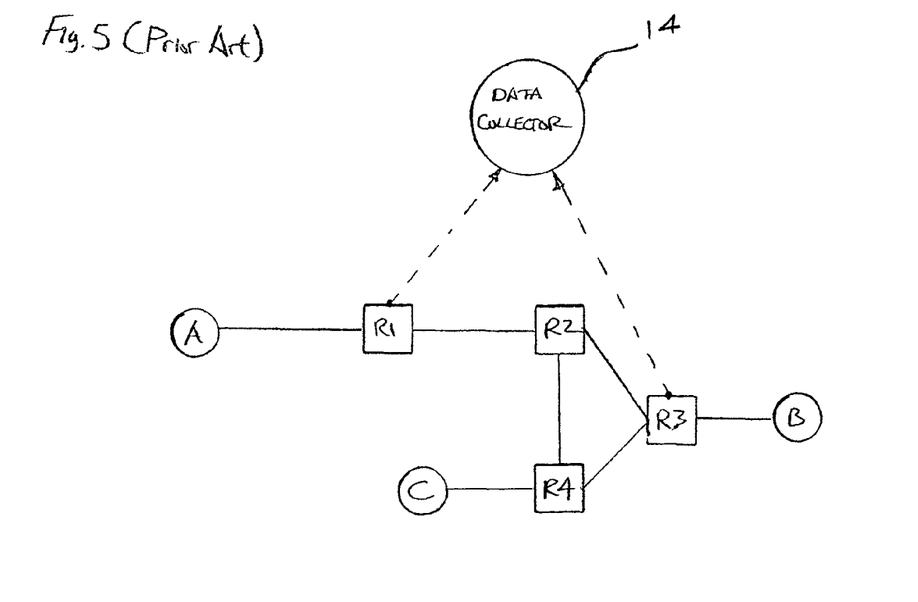
FIG. 5 is a functional block diagram of a prior art packet-switched network having multiple sampling points.
Figure 6:
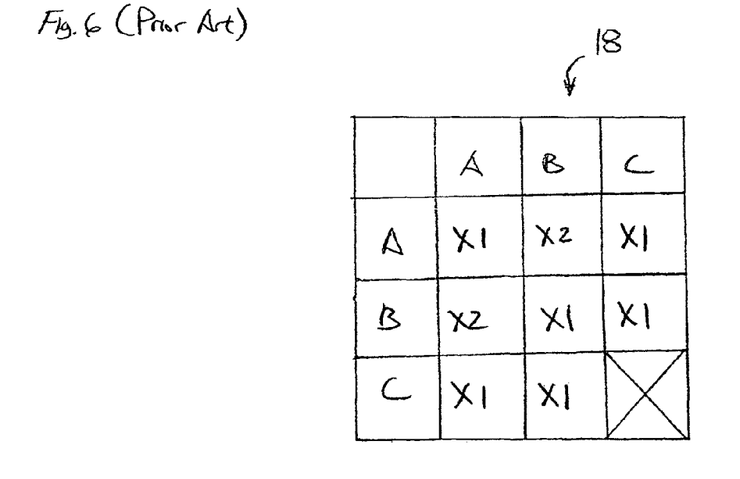
FIG. 6 is an exemplary data traffic matrix that can be generated from data monitored at the multiple sampling points of the network of FIG. 5.

The number of monitoring points can be increased, so that more of the data traffic between the nodes can be monitored. For example, as shown in FIG. 5, the data collector 14 can collect data from multiple monitoring points respectively located at Routers R1 and R3 adjacent nodes A and B. In this manner, all traffic that involves nodes A and B will be monitored at least once. Notably, traffic flowing from node C back to itself will still not be monitored in the arrangement in FIG. 5. Because traffic transmitted between a particular pair of nodes may be seen by more than one monitoring point, care must be taken to avoid double counting when combining results at the data collector 14. For example, as shown in the traffic matrix 18 illustrated in FIG. 6, data packets flowing between nodes A and B will be counted twice. Although double-counting is easy enough to account for in simple networks with very few nodes, in large networks with many thousands of nodes and a large number of monitoring points, it can be very difficult to determine how many times a particular flow of packets has been counted—especially in a dynamically changing network.

If it is assumed that for each pair of nodes there is at least one monitoring point that can see and count all the data packets between them, then duplicate counts can be resolved by the data collector 14 by using the maximum of the data packet counts received from the multiple monitoring points for any given traffic flow (e.g., from node A to node B), while ignoring any lesser data counts for the same flow. In a practical network implementation, however, not all packets that pass through a particular monitoring point are examined in detail, but rather they are sampled (for example, one in every thousand data packets that flow through a sampling point may be examined in detail). In such a scenario, because the traffic flow counts for any given flow are now necessarily expressed as estimates with a mean and a variance, taking the maximum of the data counts will result in an upward bias in the estimated traffic flow count for any flow that was seen by multiple monitoring points.

There thus remains a need to provide an improved method and system for generating traffic matrices in data networks that sample data packets.

SUMMARY OF THE INVENTION

In accordance with the present inventions, a method of monitoring traffic within a network of nodes, and a recordable medium containing a computer program with instructions that, when executed, performs such method, is provided.

In accordance with one aspect of the present inventions, the method comprises assigning a subset of network traffic sampling points to a unique pair of nodes. The sampling point subset may be assigned to the unique node pair based on, for example, historical traffic within the network, routing tables learned from the network devices, or an examination of the network topology. The number of sampling points in the subset may be fixed or variable. The sampling point subset may contain a single sampling point or multiple sampling points, although the subset preferably contains as many sampling points as possible. The sampling point subset can be assigned based on any suitable criteria, but it preferably includes the sampling points most likely to monitor all traffic flows associated with the node pair.

The method further comprises collecting diagnostic network traffic data from the sampling points, and obtaining sampled traffic flow counts for a flow associated with the node pair from the diagnostic traffic data collected from the sampling point subset. Each sampled traffic flow count is a measure of the number of traffic items (e.g., data packets, bytes, or connections) sampled by a sampling point for that flow. The flow can be, e.g., a specific flow or a total flow associated with the node pair. The method further comprises performing a function (e.g., a combinatory function) on the respective sampled traffic flow counts to obtain an estimated traffic flow count for that flow.

In one method, flows between each unique node pair in the network are monitored. In this case, the method comprises assigning a subset of the sampling points to each node pair in the network, for a flow associated with each node pair, obtaining sampled traffic flow counts from the diagnostic traffic data collected from the sampling point subset assigned to the respective node pair, performing a function (e.g., a combinatory function) on the respective sampled traffic flow counts to obtain an estimated traffic flow count for each flow, and generating a traffic matrix containing the estimated traffic flow counts.

Although the present inventions should not be so limited, the assignment of sampling point subsets to unique node pairs and the use of the sampled network diagnostic information from these sampling point subsets to generate traffic flow counts increases the number of sampling points used to generate the estimated counts for each flow, thereby increasing the number of samples taken into account when combining the respective sampled flow counts, which in turn improves the accuracy of the resulting estimated traffic flow counts.

In accordance with another separate aspect of the present inventions, the method comprises assigning network traffic sampling points to a source node and a destination node. The sampling points can be assigned to the source and destination nodes as individual nodes (i.e., one sampling point subset can be assigned to the source node and a separate sampling point subset can be assigned to the destination node) or as a unique node pair (i.e., a single sampling point subset can be assigned to the unique pair of source and destination nodes). The sampling points can be assigned based on any suitable criteria, but preferably include the sampling points most likely to monitor all data traffic associated with the source and destination nodes.

The method further comprises collecting diagnostic network traffic data from the sampling points, and obtaining sampled traffic flow counts for a flow associated with the source and destination nodes from the sampling points. The method further comprises performing a combinatory function on the respective sampled traffic flow counts to obtain estimated traffic flow counts for that flow. The combinatory function may, for example, comprise dividing the sum of the sampled traffic flow counts by the sum of the sampling probabilities of the sampling points. In one method, the sampling points are assigned to all of the nodes. For each flow seen, sampled traffic flow counts are obtained from the diagnostic traffic data collected from the sampling points assigned to the source and destination nodes of the respective node pair, and a combinatory function is performed on the respective sampled traffic flow counts to obtain an estimated traffic flow count. A traffic matrix containing the estimated traffic flow counts is then generated.

Although the present invention should not be so limited in its broadest aspects, the use of a combinatory function minimizes or prevents the upward bias in the estimated traffic flow count that may otherwise occur when performing a maximum function. The combinatory function also advantageously combines the sampling rates of the multiple sampling points, thereby increasing the effective sampling rate of the network, to provide a more accurate estimate for each traffic flow count.

In accordance with still another separate aspect of the present inventions, the method comprises obtaining historical network traffic data over a plurality of network traffic sampling points, and assigning sampling points to the nodes based on the historical traffic data. The sampling points can be assigned to the nodes as individual nodes (i.e., separate sampling point subsets can be assigned to the nodes) or as unique node pairs (i.e., a single sampling point subset can be assigned to each unique pair of nodes). The sampling points can be assigned based on any suitable criteria, but preferably include the sampling points most likely to monitor all data traffic associated with the nodes or node pairs.

The method may optionally comprise obtaining sampled traffic flow counts for a flow associated with source and destination nodes of a unique pair of nodes from the diagnostic traffic data collected from the sampling points assigned to the source and destination nodes, and performing a function on the sampled traffic flow counts to obtain estimated traffic flow counts for that flow. Although the present invention should not be so limited in its broadest aspects, the use of historical traffic data lends itself well to automated determination and assignment of sampling point subsets and adaptation to a dynamically changing network.

In accordance with yet another separate aspect of the present inventions, the method comprises automatically determining network traffic sampling points most likely to monitor traffic associated with a source node and a destination node, and automatically assigning the sampling points to the source and destination nodes. In one method, the sampling points most likely to monitor all traffic associated with the source and destination nodes are determined. The sampling points can be assigned to the source and destination nodes in any one of variety of manners. For example, a source subset of sampling points can be determined to be most likely to monitor traffic associated with the source node, and a destination subset of sampling points can be determined to be most likely to monitor traffic associated with the destination node, in which case, the source and destination sampling point subsets can be respectively assigned to the source and destination nodes. Or, the sampling points can be determined to be most likely to monitor traffic associated with the source and destination nodes as a unique node pair, in which case, the sampling points can be assigned to the unique node pair.

The method may optionally comprise obtaining sampled traffic flow counts for a flow associated with the source and destination from the diagnostic traffic data collected from the sampling points assigned to the source and destination nodes, and performing a function on the sampled traffic flow counts to obtain estimated traffic flow counts for that flow. Although the present invention should not be so limited in its broadest aspects, the automation of the sampling point determination and assignment steps allows a dynamically changing network to be monitored efficiently and accurately.

Other objects and features of the present invention will become apparent from consideration of the following description taken in conjunction with the accompanying drawings.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE ILLUSTRATED EMBODIMENTS

Figure 7:
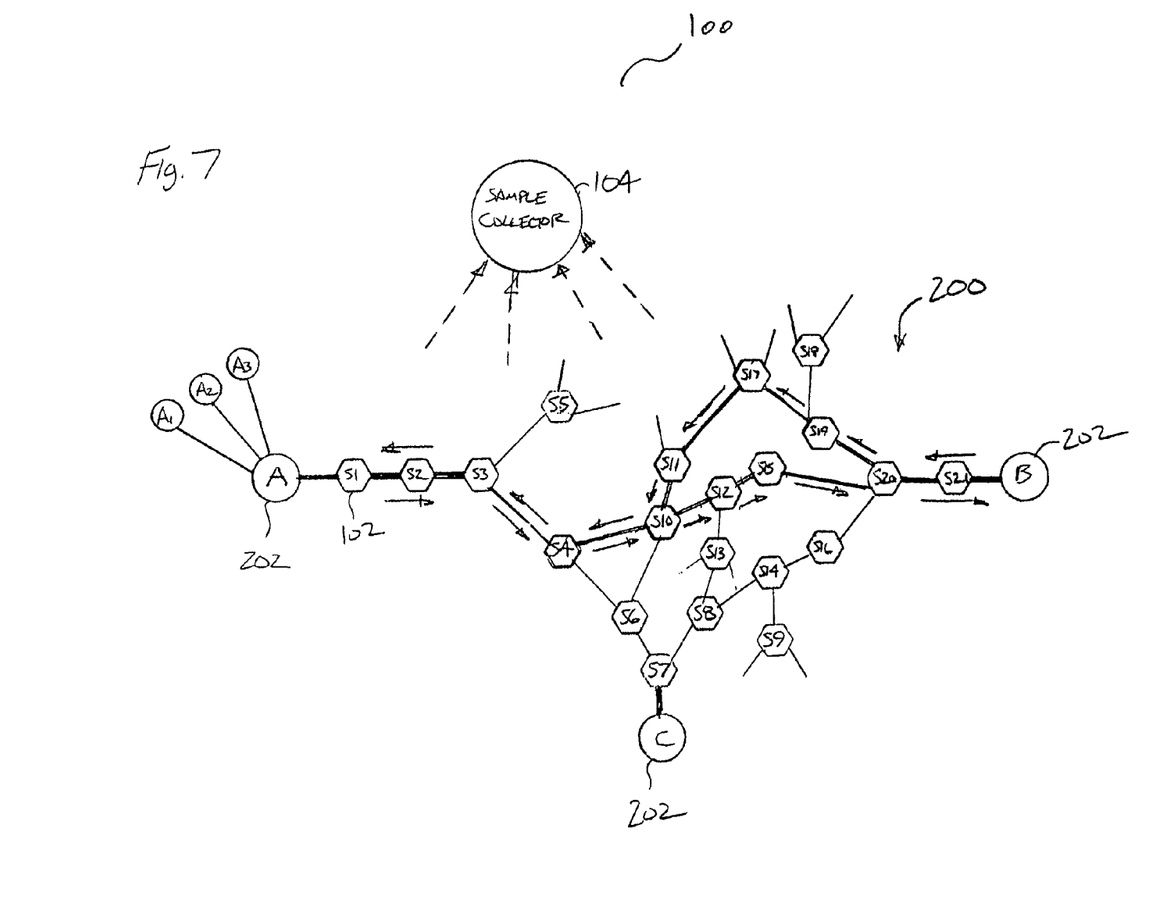
FIG. 7 is a functional block diagram of a monitoring system constructed in accordance with one embodiment of the present inventions, wherein the monitoring system is used to monitor data flowing through a network of nodes.

Referring to FIG. 7, an exemplary network monitoring system 100 constructed in accordance with the present invention will now be described. The monitoring system 100 is configured to monitor traffic flowing through a network 200 of nodes 202 (illustrated as nodes A, B, and C). In the illustrated embodiment, the network 200 is a data packet-switched network that is capable of routing data packets between the nodes 202, and specifically from a source node to a destination node. The nodes 202 may take the form of any device that has an address (which in the illustrated embodiment, is an Internet Protocol (IP) address) from or to which data packets can be routed. For example, the node 202 can be an end node, such as an end user computer or device within the user computer, or a subnet, such as a Local Area Network (LAN), which serves end nodes (e.g., end nodes $A_1$, $A_2$, and $A_2$ of subnet node A). The monitoring system 100 generally comprises a plurality of sampling agents 102 (illustrated as sampling agents S1-S21) distributed throughout the network 200 at select sampling points, and a sample collector 104 that collects network traffic data from the sampling agents 102. Although, for purposes of simplicity, only three nodes 202 and twenty-one sampling agents 102 are illustrated in FIG. 7, there will be many more nodes and sampling agents in a typical network, and typically, many more nodes than sampling agents.

In the illustrated embodiment, each of the sampling agents 102 is associated with a switch or router in a known manner, so that they can monitor data packets as they flow through the switch or router (not shown). Because a particular switch or router may handle hundreds of thousands, if not millions of data packets per second, the sampling agents 102 preferably do not sample all data packets that flow through the associated port. Rather, the sampling agents 102 perform packet-based sampling to select a representative sample of packets to analyze. Specifically, on average, 1 in N data packets is selected from each data packet flow. Thus, each sampling agent 102 will have a sampling probability equal to 1/N. The sampling agents 102 may have uniform sampling probabilities, but typically, will have sampling probabilities that substantially vary from one another. The sampling agents 102 may sample the data packets in a promiscuous manner, but preferably are sampled in a non-promiscuous manner, such as that described in U.S. patent application Ser. No. 09/438,680, entitled "Intelligent Collaboration Across Network System," which is hereby expressly incorporated herein by reference.

Each of the sampling agents 102 generates reporting data packets, which provide diagnostic network traffic data relating to the sampled data packets flowing through the switches or routers. The sample collector 104 collects these reporting packets from a number of the sampling agents 102 from which it can construct a detailed, real-time, picture of traffic on the entire network 200. The diagnostic information within the reporting packets can be used to detect faults and overload conditions on the network 200, as well as balance the way in which traffic sources are connected to the routers or switches. Misconfigured switches and routers can present security problems and result in poor performance. Analysis of the traffic measurements may reveal that traffic is not being routed or filtered as intended and thus help identify configuration problems.

Preferably, the reporting packets are transmitted without delay to the sample collector 104 from the respective sampling agents 102, so that the sample collector 104 has real-time access to the diagnostic data. Preferably, the reporting packets are transmitted in an asynchronous manner in order to prevent overloading the network, which may otherwise occur if the reporting packets were synchronously transmitted to the sample collector 104. It should be noted that the functions of the sample collector 104 can be implemented in hardware, firmware, software, or in combination thereof. Preferably, however, the functions of the sample collector 104 are implemented in a computer program having computer executable instructions, which may be stored on any suitable medium, such as a hard drive or CD-ROM, and may be executed to perform the required instructions. Further details regarding the general structure, function, and operation of sampling agents and sample collectors are disclosed in U.S. patent application Ser. No. 09/438,680, which has previously been incorporated herein by reference.

In performing its traffic monitoring functions, the sample collector 104 generates a data traffic matrix containing traffic flow counts, much like the traffic matrix 12 illustrated in FIG. 2. For the purposes of this specification, a particular traffic flow count is the number of times a categorized data traffic item associated with a unique pair of source and destination nodes is transmitted through the network. The data traffic item can be any category of traffic data desired to be measured, e.g., a data packet, byte, or connection. A traffic item may be contained within a "traffic flow," which for the purposes of this specification, refers to a set of one or more data packets associated with a node pair over a given interval. The traffic between a node pair may be made up of a single flow, or it may be made up of a plurality of separate flows, depending on the level of detail used to separate one flow from another. For example, flows may be distinguished by more detailed addressing (selecting more specific end-points from within the source or destination node) or by more detailed protocol or type information extracted from fields in the data packets or derived therefrom. Thus, a particular traffic flow count that is obtained for a particular node pair may be for a specific traffic flow between that node pair, or may be for a total traffic flow between the node pair.

In any event, the traffic flow counts are derived from sampled traffic flow counts, which may be obtained from the reporting data packets collected from the sampling agents 102. For the purposes of this specification, a sampled traffic flow count is the number of times a traffic item associated with a unique node pair is sampled by a respective sampling agent 102. Notably, a particular traffic item associated with a unique node pair may be sampled several times, in which case, it will be counted several times, or may not be sampled at all, in which case, it will not be counted.

The sampled traffic flow counts can be obtained from the sampling agents 102 in any one of a variety of manners. For example, the reporting data packets may contain the actual traffic flow counts itemized for each flow seen between each unique node pair over a given interval, in which case, the sample collector 104 need only directly extract the sampled traffic flow counts from the reporting packets. Because this would require complex time-synchronization between the sample collector 104 and sampling agents 102, the sampled traffic flow counts are preferably calculated by the sample collector 104. In particular, the reporting packets collected by the sample collector 104 will contain raw data (e.g., the source and destination addresses of nodes for each instance of a sampled data packet, the type and size of the data packet, etc.) from which the sample collector 104 may derive the sample traffic counts in any suitable manner, depending on the nature of the particular traffic item to be measured. For example, if the traffic item is categorized by data packet, the sample collector 104 may simply derive the sampled traffic flow count by counting each sampled data packet associated with the respective pair of unique nodes. If the traffic item is categorized by byte, the sample collector 104 may derive the sampled traffic flow count by counting each sampled data packet that contains the unique node pair and multiplying that count by the average byte count per data packet. If the traffic item is categorized by connection, the sample collector 104 may derive the sampled traffic flow count by counting each sampled data packet that indicates that a connection has been made between the unique node pair. If the traffic item is sub-categorized by class or protocol, the sample collector 104 may simply derive the sampled traffic flow count by only counting each traffic item in that class or protocol associated with the unique node pair.

Besides providing information from which data traffic counts can be obtained or otherwise derived, the reporting packets may also contain the total number of samples taken and the total number of data packets from which samples were taken. The sampling probability of the respective sampling agent 102 from which the reporting packets are collected can be derived by dividing the total number of samples taken by the total number of data packets from which the samples were taken.

Figure 8:
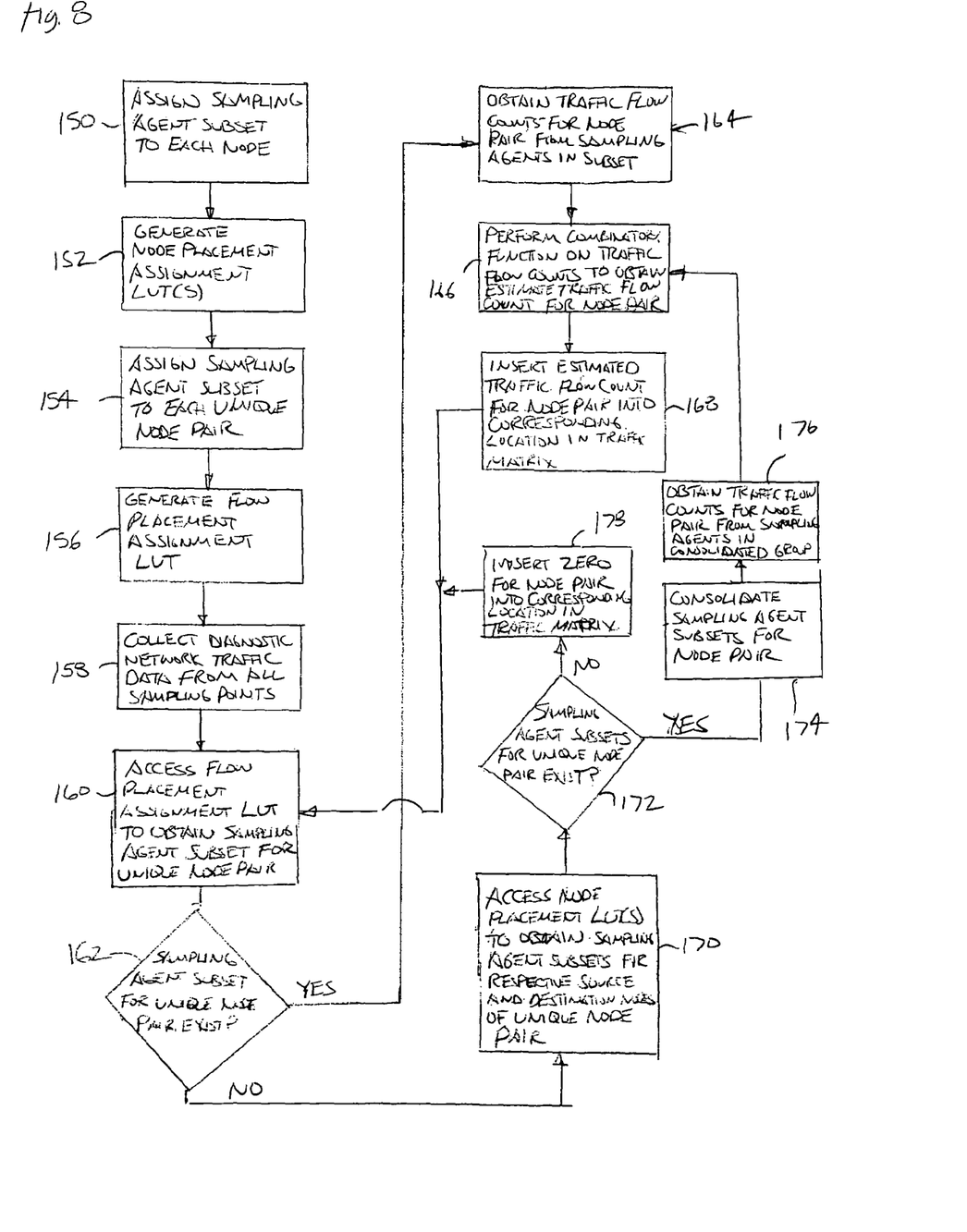
FIG. 8 is a flow diagram illustrating the steps performed by the monitoring system of FIG. 7 to generate a traffic matrix for the network of nodes.

Referring to FIG. 8, a method performed by the monitoring system 100 to generate a traffic matrix will now be described. The sample collector 104 assigns sampling agents 102 to the nodes 202, which assignments are then arranged in one or more sampling agent assignment look-up tables (LUTs) (shown in FIGS. 9, 10, and 11) (action blocks 150, 152, 154, and 156). Assignment of the sampling agents 102 can be accomplished using a "Node Assignment" methodology and/or "Node-Pair Assignment" methodology, although preferably, at least the Node-Pair Assignment Methodology is used to assign sampling agents 102 to the nodes 202, as will be described in further detail below. In the method illustrated in FIG. 8, the Node-Pair Assignment methodology will be used as the primary means for assigning the sampling agents 102, and the Node Assignment methodology will be used as the second means for assigning the sampling agents 102.

In the Node Assignment methodology, a subset of sampling agents 102 is assigned to each node 202 (e.g., nodes A, B, or C) (action block 150), and then Node Assignment LUT (s) (shown in FIGS. 9 and 10) are generated from the nodes 202 and corresponding sampling agent subsets. In the illustrated method, each sampling agent subset contains the sampling agents 102 that are most likely to monitor all of the data traffic associated with the respective node 202. For example, the sampling agents 102 selected for node A should be S1, S2, and S3. Likewise, the sampling agents 102 selected for nodes B and C should be sampling agents S20, S21, and S7.

In one method, a combined sampling agent subset, which contains the sampling agents 102 most likely to monitor all of the traffic associated with a particular node 202, regardless of its function as a source or destination, can be assigned to each node 202. In this case, a combined Node Assignment LUT 106, which contains sampling agent subsets assigned to the respective nodes 202, can be generated, much like that illustrated in FIG. 9. However, because traffic may typically be bilaterally asymmetrical (i.e., data packets transmitted from a first node to a second node may take a different route than data packets transmitted from the second node to the first node), two sampling agent subsets are preferably assigned to each node 202. In particular, a source subset, which contains the sampling agents 102 most likely to monitor all of the data traffic for that node acting as a source (e.g., the data packets contain the source address of the node 202), and a destination subset, which contains the sampling agents 102 most likely to monitor all of the data traffic for that node acting as a destination (e.g., the data packets contain the destination address of the node 202), can be assigned to the node 202. In this case, a source Node Assignment LUT 108, which contains the sampling agent subsets assigned to the respective nodes 202, as sources, and a destination Node Assignment LUT 110, which contains the sampling agents subsets assigned to the respective nodes 202, as destinations, can be generated, much like those illustrated in FIG. 10.

In the Node-Pair Assignment methodology, a subset of sampling agents 102 is assigned to each unique pair of nodes 202 (e.g., unique node pairs AA, AB, AC, BA, BB, BC, CA, CB, CC) node 202 (action block 154). In the illustrated method, each sampling agent subset contains the sampling agents 102 that are most likely to monitor all of the data traffic associated with the respective node pair—as opposed to a single node 202 like in the Node Assignment methodology. For example, the sampling agents 102 selected for the unique node pair AB (node A is a source, and node B is a destination) should be the ones along the path from node A to node B (shown as arrows), namely sampling agents S1, S2, S3, S4, S10, S12, S15, S20, and S21. The sampling agents 102 selected for the unique node pair BA (node B is a source, and node A is a destination) should be the ones along the traffic flow from node B to node A (shown as arrows), namely sampling agents S1, S2, S3, S4, S10, S11, S17, S19, S20, and S21. Likewise, the sampling agents 102 selected for unique node pairs AC, CA, BC, and CB should be the sampling agents that reside along the respective paths between the respective node pairs. Once they are determined, the sampling agent subsets for the respective unique node pairs are then arranged in the Node-Pair Assignment LUT 112 (action block 156), much like that illustrated in FIG. 11.

Regardless of which methodology, each sampling agent subset may contain any number of sampling agents 102, including a single sampling agent. However, each sampling agent subset preferably contains as many sampling agents as possible, since the effective, network-wide sampling rate is proportionately increased with an increase in the sampling agents used to sample the traffic associated with the respective node 202, thereby increasing the accuracy of the resulting traffic matrix. Also, because it is preferable that as many sampling agents 102 as possible be contained in each subset assigned to a respective node 202, the number of sampling agents 102 will preferably vary. In this case, every sampling agent 102 that is likely to monitor all data traffic associated with a node 202 can be assigned to the respective node 202. The number of sampling agents 102 within any given subset, however, may be fixed. In this case, a fixed number (e.g., five) of sampling agents 102 that are most likely to monitor all data traffic associated with a node 202 can be assigned to the respective node 202. It should also be noted that the assignment of the particular sampling agents 102 to a given node 202 is preferably dynamic (i.e., a sampling agent subset may change after it is assigned to a node) in order to adapt to the changing routing and topology conditions of the network. Alternatively, however, the assignment of the particular sampling agents 102 to a given node 202 may be fixed (i.e., a sampling agent subset does not change once it is assigned to a node)—although such an implementation is generally not preferable in dynamically changing networks.

It should be noted that in some cases, it may be helpful to assign sampling agents 102 that monitor only a portion of the data traffic associated with a particular node 202 (if the Node Assignment methodology is used) or unique node pair (if the Node-Pair Assignment methodology is used). For example, if it is known that the data packets associated with the node 202 will be alternately routed through two sampling agents 102 (i.e., 50% of the data packets will be routed through the first sampling agent, and the other 50% of the data packets will be routed through the second sampling agent), then the two sampling agents 102 can be combined as one (by simply aggregating their counts together), and assigned to the node or node pair 202. Such scenarios are common in load balancing arrangements, where traffic flowing through a portion of the network may be split between two or more paths.

The sampling agents 102 that are most likely to monitor all data traffic (or alternatively, a known percentage of data traffic) associated with a particular node 202 can be determined in any one of a variety of manners, e.g., inferring these sampling agents 102 from the network topology or by examining the routing tables of each of the switches or routers to determine where data packets associated with a given node 202 will be routed to or from. However, the determination of which sampling agents 102 should be in a particular subset is preferably made by obtaining historical traffic data from the network over all of the sampling agents 202. In particular, data from the sampling agents 102 can be collected over a period of time (e.g., 24 hours) and then examined to determine the sampling agents 102 that are most likely to monitor all data traffic associated with each node 202—at least in the near future. This determination can be made by selecting the sampling agents 102 that have historically reported traffic for a given node 202 or unique node pair, and then performing a standard statistical significance test on these selected agents to eliminate those whose traffic count estimate was significantly less than the highest estimate. Notably, the use of historical data to determine which sampling agents 102 should be assigned to a node (Node Assignment) or unique node pair (Node-Pair Assignment) also lends itself well to automation, thereby allowing sampling agent subsets to be dynamically changed over time in an efficient manner as traffic conditions vary.

In one method, the historical data takes the form of data packet counts obtained from the reporting packets collected from the sampling agents 102. Because each data packet transmitted through the network contains a source address and a destination address, each data packet can be associated with both a source node and a destination node, which may be the same node. Thus, if a single sampling agent subset is to be assigned to a node using the Node Assignment methodology, all data packets containing the address of that node (whether a source address or destination address) will be considered in the selection of the sampling agents 102 for that subset. If, however, separate source and destination sampling agent subsets are to be assigned to a node using the Node Assignment methodology, the data packets containing the source address of that node will be considered in the selection of the sampling agents 102 for that source subset, and the data packets containing the destination address of that node will be considered in the selection of the sampling agents 102 for that destination subset. If a sampling agent subset is to be assigned to a node pair using the Node-Pair Assignment methodology, only data packets containing both the source address of the source node and the destination address of the destination node will be considered in the selection of the sampling agents 102 for that subset.

Whichever method is used to assign sampling agent subsets to nodes 202, it is preferable that only those addresses that the network 200 uses to route the traffic are used to determine the sampling agents 102 that are most likely to monitor all data traffic (or in some cases, a known percentage of data traffic) associated with a particular node 202. For example, it may only be necessary to focus on the IP addresses of subnets—rather than the IP addresses of all of nodes 202. Or, it may only be necessary to focus on Media Control Access (MAC) addresses, rather than MAC+VLAN (Virtual Local Area Network) addresses. In this manner, the method used to assign sampling agent subsets to nodes 202 can be streamlined, thereby minimizing the data and/or amount of time needed to assign the sampling agent subset. In any event, the type of traffic used to determine the assignment of sampling agents 102 to a particular unique node pair may be different from, be more general than, or be a subset of, the traffic flows that will ultimately be measured using the assigned sampling agents 102. For example, all historical data traffic associated with the unique node pair may be used to determine the assignment of a sampling agent subset to that node pair, although perhaps only voice-data flows associated with that node pair will be subsequently measured, or the flows subsequently measured may be broken out in more detail, using more specific addressing, protocol and type information to distinguish separate flows.

Referring back to FIG. 8, once the sampling agent subsets have been assigned to the nodes 202, the sample collector 104 collects the diagnostic network traffic data (i.e., the reporting data packets) from all of the sampling agents 102 in real-time (action block 158). The sample collector 104 then accesses the appropriate LUT(s) and looks up the sampling agent subsets corresponding to the source node and destination node of each separately identified flow. In the illustrated method, the sample collector 104 utilizes the LUTs generated by both the Node Assignment and Node-Pair Assignment methodologies, with the Node-Pair Assignment LUT 112 (shown in FIG. 11) used as the primary LUT, and the Node Assignment LUT(s) 106, 108, 110 (shown in FIGS. 9 and 10) used as the secondary LUT(s). The Node-Pair Assignment LUT 112 is used as the primary LUT, because the Node-Pair Assignment methodology is generally superior to the Node Assignment methodology for several reasons.

First, there is one common scenario where the Node Assignment methodology may yield incorrect results. For example, referring back to FIG. 7, if sampling agent S7 is not available, then sampling agent S6 may be erroneously assigned to node C using the Node Assignment methodology if it monitors significantly more traffic associated with node C than does sampling agent S8. Because sampling agent S6 monitors all traffic from node C to node A, the traffic from node C to node A may be estimated correctly. However, because the sampling agent S6 does not or seldom monitors traffic from node C to node B, the traffic from node C to node B will be underestimated. Traffic from node B to node C will likewise suffer from the same problem. In contrast, when the Node-Pair Assignment methodology is used, the sampling agent S6 may be assigned to unique node CA, thereby resulting in a correct estimate of the traffic from nodes A to node C, and sampling agent S8 may be assigned to unique node pair CB, thereby resulting in a correct estimate of the traffic from node C to node B. Traffic from respective nodes A and B to node C will likewise be correctly estimated.

Second, more sampling agents 202 are generally assigned using the Node-Pair Assignment methodology. For example, if the unique node pair is AB, sampling agents S1, S2, S3, S20, and S21 are used to estimate the traffic from node A to node B in the case where the Node Assignment methodology assigns a combined sampling subset to each node 202 (see LUT in FIG. 9), and only sampling agents S1, S3, and S21 are used in the case where the Node Assignment methodology is used to assign source and destination sampling agent subsets to respective source and destination nodes (see LUTs in FIG. 10). That is, the Node Assignment methodology only uses the sampling agents found at the edges of the network 100. In contrast, if the unique pair is AB, sampling agents S1, S2, S3, S20, and S21, as well as the intervening sampling agents S4, S10, S12, and S15, are used to estimate the traffic from node A to node B in the case where the Node-Pair Assignment methodology assigns the sampling agent subset to the unique node pair. This is significant because, as previously described above, the effective network sampling rate is increased with the addition of sampling agents, thereby increasing the accuracy of the resulting traffic matrix entries.

Another benefit of increasing the number of sampling agents for each subset is that it minimizes the chance that the combination of sampled traffic flow counts for a particular node pair will return with a zero traffic flow count. For example, if only sampling agent S4 sampled a particular flow from node A to node B, the sample collector 104 would have to discard the resulting sampled traffic flow count and report a traffic flow count of zero if the Node Assignment LUT(s) 106, 108, 110 are used. If, on the other hand, the Node-Pair Assignment LUT 112 is used, the sample collector 104 could use the sampled traffic flow count from the sampling agent S4, and thus report a non-zero traffic flow count, as calculated by the combination function.

Although the Node-Pair Assignment methodology is generally superior to the Node Assignment methodology, there may be times when the Node-Pair Assignment lookup table (LUT) 112 may contain insufficient data for a particular node pair. Ideally, there would be an entry in the Node-Pair Assignment LUT 112 for each unique node pair. In practice, however, this is generally not possible. In particular, the Node-Pair Assignment LUT 112 is typically much larger than any of the Node Assignment LUTs 106, 108, 110, since it has an entry for every unique combination of a source and destination node. That is, the Node-Pair Assignment LUT 112 will potentially be of size N×N (where N equals the number of nodes), whereas the combined Node Assignment LUT 106 will be of size N, and the Node Assignment LUTs 108, 110 will have a combined size of 2×N. As a result, the entries within the Node Assignment LUTs 106, 108, 110 will often be backed up by more "supporting evidence" (more samples) than the entries in the Node-Pair Assignment LUT 112. This is significant, because the statistics requires that there be "sufficient evidence" before an entry in a LUT can be created. Thus, if there were not enough samples to define a sampling agent subset, an entry cannot be created for it in the LUT. Because of this, the Node Assignment LUTs 106, 108, 110 may become immediately useful if the Node-Pair Assignment LUT 112 fails for a particular unique node pair.

With this said, the sample collector 104 first accesses the assignment LUT generated by the Node-Pair Assignment methodology to obtain the sampling agent subset for a unique node pair (action block 160). For example, if the unique node pair is AB, the sampling agent subset will contain sampling agents S1, S2, S3, S4, S10, S12, S15, S20, and S21. If a sampling agent subset exists within the Node-Pair Assignment LUT for that node pair (decision block 162), the sample collector 104 then obtains sampled traffic flow counts for a traffic flow from the sampling agents in that subset (action block 164). As briefly discussed above, the sampled traffic flow counts can be directly extracted from the reporting data packets, or can be derived from raw data contained within the reporting data packets.

Next, the sample collector 104 performs a combinatory function on the sampled traffic flow counts obtained from the respective sampling agent subset to obtain an estimated traffic flow count for the flow (action block 156). For the purposes of this specification, a combinatory function is any function performed on a plural number of items that produces a result that is not identical to any of the items on which the function is performed. Notably, performing a combinatory function on the sampled traffic flow counts, as opposed to a selective function (such as a maximum function), minimizes any bias that may otherwise occur in the estimated traffic flow count. In the illustrated embodiment, the estimated traffic flow count for a flow can be calculated by summing the sampled traffic flow counts obtained from the corresponding sampling agent subset, summing the sampling probabilities of the sampling agent subset, and then dividing the traffic flow count sum by the sampling probability sum. This equation can be written as follows:

$$CNT_{Est} = \frac{(CNT_1 + CNT_2 + \ldots CNT_n)}{(PRB_1 + PRB_2 + \ldots PRB_n)}$$

where $CNT_{Est}$ is the estimated traffic flow count for a particular flow, CNT is the sampled traffic flow count obtained from a sampling agent 102 within the corresponding sampling agent subset, PRB is the sampling probability of a sampling agent 102 within sampling agent subset, and n is the number of sampling agents 102 within the sampling agent subset. Notably, even if the sampled traffic flow count obtained from a particular sampling agent 102 within the subset is zero, or otherwise not reported to the sample server 104, it will still be included within the estimated traffic flow count calculation. It should be noted that the equation set forth above assumes that each assigned sampling agent 102 within the respective sampling agent subset monitors all traffic associated with the corresponding unique node pair. Next, the sample collector 104 logically inserts the estimated traffic flow count for the respective flow into the corresponding location in the traffic matrix (action block 168). The method then returns to action block 160, whereat the Node-Pair Assignment LUT 112 is again accessed to obtain a sampling agent subset for another unique node pair.

If, at decision block 162, a sampling agent subset does not exist within the Node-Pair Assignment LUT for that node pair, the sample collector 104 accesses the Node Assignment LUT(s) 106, 108, 110 to obtain the sampling agent subsets for the respective source and destination nodes of the unique node pair (action block 170). If the Node Assignment methodology was used to assign a combined subset to each node 202, the sample collector 104 accesses the combined Node Assignment LUT 106 (shown in FIG. 9) to obtain both sampling agent subsets for the source and destination nodes of each unique node pair. For example, if the unique node pair is AB, the sampling agent subset for source node A will contain sampling agents S1, S2, and S2, and the sampling agent subset for destination node B will contain sampling agents S20 and S21. If the Node Assignment methodology was used to assign source and destination subsets to each node 202, the sample collector 104 accesses the source Node Assignment LUT 108 (shown in FIG. 10) to obtain the sampling agent subsets for the source node of the respective node pair, and accesses the destination Node Assignment LUT 110 (shown in FIG. 10) to obtain the sampling agent subsets for the destination node of the respective node pair. For example, if the unique node pair is AB, the sampling agent subset for the source node A will contain sampling agents S1 and S3, and the sampling agent subset for the destination node B will be contain sampling agent S21.

Figure 9:
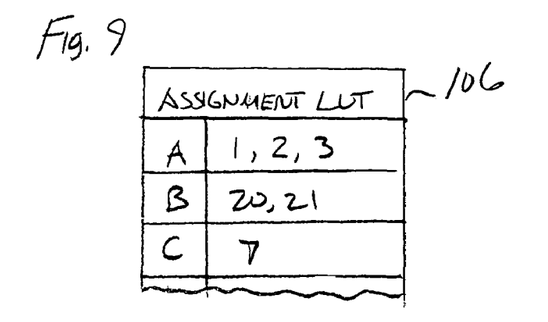
FIG. 9 is a combined sampling agent look-up table generated using a Node Assignment methodology.
Figure 10:
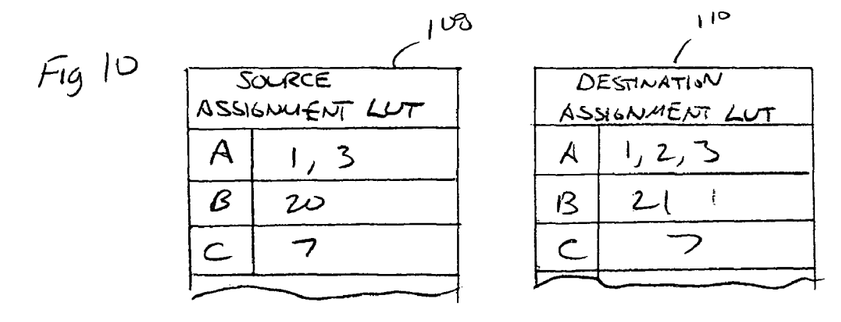
FIG. 10 is are source and destination sampling agent look-up tables generated using a Node Assignment methodology.
Figure 11:
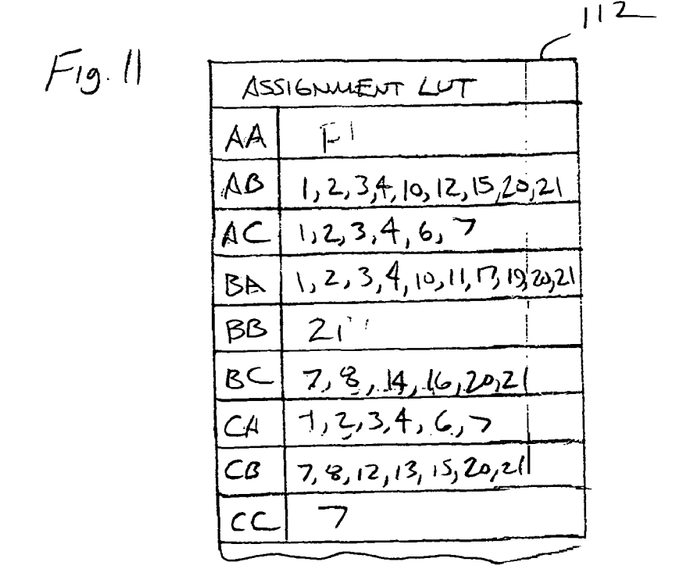
FIG. 11 is a sampling agent look-up table generated using a Node-Pair Assignment methodology.

If a sampling agent subset exists within the Node Assignment LUT(s) for that node pair (decision block 172), the sample collector 104 consolidates the sampling agent subsets for the node pair (action block 174) by taking the union of the two sets. For example, if the unique pair is AB, the consolidated sampling agents will be S1, S2, S3, S20, and S21, if a consolidated Node-Pair Assignment LUT 106 is accessed (FIG. 9) or S1, S3, and S21 if the source and destination Node Assignment LUTs 108, 110 are accessed (FIG. 10). The sample collector 104 then obtains sampled traffic flow counts from the sampling agents in that consolidated group of sampling agents (action block 176), and then performs the above-described combinatory function on these sampled traffic flow counts to obtain an estimated traffic flow count for the respective flow (action block 166). Next, the sample collector 104 inserts the estimated traffic flow count for the respective flow into the corresponding location in the traffic matrix (action block 168). If, at decision block 172, a sampling agent subset does not exist within the Node-Pair Assignment LUT(s) for either of the source or destination nodes of the unique node pair, the sample collector inserts a zero for the respective flow into the corresponding location in the traffic matrix (action block 178). The method then returns to action block 160, whereat the Node-Pair Assignment LUT 112 is again accessed to obtain a sampling agent subset for another unique node pair.

It should be noted that, in some cases, it may be desired to only measure the traffic from or to a specific node, referred to as node-specific traffic counts, as opposed to measuring the traffic between the nodes of a unique node pair, otherwise resulting in traffic flow count. For example, it may be desired to only measure traffic coming from a particular node, regardless of the destination of the traffic, in which case, an estimated source traffic count (i.e., all traffic from the node) may be obtained by adding the estimated traffic flow counts associated with that particular node as a source. For example, if it is desired to measure the traffic from node A, an estimated source traffic count can be obtained by adding the estimated traffic flow counts (obtained from the traffic matrix) associated with the unique node pairs AA, AB, and AC.

Alternatively, if a traffic matrix from which the estimated source traffic count could otherwise be conveniently derived does not exist, the estimated source traffic count can be obtained by applying the previously described combinatory function to sampled source traffic counts associated with that node, as a source, (i.e., sampled traffic from the node) obtained from sampling agents that monitor all traffic from the node. For example, if the combined Node Assignment LUT 106 of FIG. 9 is used, the estimated source traffic count for node A can be obtained by performing the combinatory function on the sampled source traffic counts for node A acquired from sampling agents S1, S2, and S3. If the source Node Assignment LUT 108 of FIG. 10 is used, the estimated source traffic count for node A can be obtained by performing the combinatory function on the sampled source traffic counts for node A acquired from the sampling agents S1 and S3.

As another example, it may be desired to only measure traffic going to a particular node, regardless of the source of the traffic, in which case, an estimated destination traffic count (i.e., all traffic to the node) may be obtained by adding the estimated traffic flow counts associated with that particular node as a destination. For example, if it is desired to measure the traffic to node A, an estimated destination traffic count can be obtained by adding the estimated traffic flow counts associated with the unique node pairs AA, BA, and CA, as obtained from the traffic matrix.

Alternatively, if a traffic matrix from which the estimated destination traffic count could otherwise be conveniently derived does not exist, the estimated destination traffic count can be obtained by applying the previously described combinatory function to sampled destination traffic counts for that node (i.e., sampled traffic from the node) obtained from sampling agents that monitor all traffic to the node. For example, if the combined Node Assignment LUT 106 of FIG. 9 or the destination Node Assignment LUT 110 of FIG. 10 is used, the estimated destination traffic count for node A can be obtained by performing the combinatory function on the sampled destination traffic counts for node A acquired from the sampling agents S1, S2, and S3.

As still another example, it may be desired to measure traffic associated with a particular node, regardless of the source or destination of the traffic, in which case, an estimated traffic count (i.e., all traffic to and from the node) may be obtained by adding the estimated traffic flow counts associated with that particular node as a source and a destination. For example, if it is desired to measure the traffic to and from node A, an estimated traffic count can be obtained by adding the estimated traffic flow counts associated with the unique node pairs AA, AB, BA, AC, and CA, as obtained from the traffic matrix.

Alternatively, if a traffic matrix from which the estimated traffic count could otherwise be conveniently derived does not exist, the estimated traffic count can be obtained by applying the previously described combinatory function to sampled source traffic counts (i.e., sampled traffic to the node) obtained from sampling agents that monitor all traffic from the node to obtain an estimated source traffic count, and applying the previously described combinatory function to sampled destination traffic counts (i.e., sampled traffic from the node) obtained from sampling agents that monitor all traffic to the node to obtain an estimated destination traffic count, and then adding the estimated source and destination traffic counts. For example, if the combined Node Assignment LUT 106 of FIG. 9 is used, the estimated traffic count for node A can be obtained by performing the combinatory function on the sampled source and destination traffic counts for node A obtained from the sampling agents S1, S2, and S3. If the source and destination Node Assignment LUT 108, 110 of FIG. 10 is used, the estimated traffic count for node A can be obtained by summing the estimated source traffic count for node A, which can be obtained by performing the combinatory function on the sampled source traffic counts for node A acquired from the sampling agents S1 and S3, and the estimated destination traffic count for node A, which can be obtained by performing the combinatory function on the sampled destination traffic counts for node A acquired from the sampling agents S1, S2, and S3.

Although particular embodiments of the present invention have been shown and described, it will be understood that it is not intended to limit the present invention to the preferred embodiments, and it will be obvious to those skilled in the art that various changes and modifications may be made without departing from the spirit and scope of the present invention. Thus, the present inventions are intended to cover alternatives, modifications, and equivalents, which may be included within the spirit and scope of the present invention as defined by the claims.

What is claimed is:

1. A method of monitoring traffic within a network of nodes, the method comprising:
   assigning a subset of network traffic sampling points to each unique pair of nodes in the network; each said subset comprising a plurality of sampling points distributed throughout the network;
   collecting diagnostic network traffic data from the sampling points assigned to each node pair in the network;
   for a flow associated with each node pair in the network, obtaining sampled traffic flow counts from the diagnostic traffic data collected from the sampling point subset assigned to the node pair; each set subset comprising a plurality of sampling points, said sampling points adapted to provide diagnostic network traffic data comprising a source address and a destination address even if the flow data passes more than one sampling point; and
   for each flow, performing a function on the respective sampled traffic flow counts to obtain an estimated traffic flow count for the flow.

2. The method of claim 1, wherein the flow is a specific traffic flow associated with the node pair.

3. The method of claim 1, wherein the flow is a total traffic flow associated with the node pair.

4. The method of claim 1, further comprising
   generating a data traffic matrix containing the estimated traffic flow counts.

5. The method of claim 1, wherein the sampling point subset is assigned to the node pair based on historical traffic data.

6. The method of claim 1, further comprising determining sampling points most likely to monitor all data traffic associated with the node pair, wherein the determined sampling points are included within the sampling point subset.

7. The method of claim 1, wherein the function is a combinatory function.

8. The method of claim 7, wherein each sampling point has a sampling probability, and the combinatory function comprises dividing the sum of the sampled traffic flow counts by the sum of the sampling probabilities.

9. The method of claim 1, wherein the estimated traffic flow count is one of an estimated data packet count, an estimated byte count, and an estimated connection count.

10. The method of claim 1, further comprising deriving a node-specific estimated traffic count for a node of the node pair at least partially from the estimated traffic flow count.

11. A non-transitory medium carrying a computer program having instructions that, when executed, perform a method of monitoring traffic within a network of nodes, comprising:
    assigning a subset of network traffic sampling points to each unique pair of nodes within the network of nodes; each said subset comprising a plurality of sampling points distributed throughout the network; said sampling points adapted to provide diagnostic network traffic flow comprising a source address and a destination address, even if the flow passes more than one sampling point;
    collecting diagnostic network traffic data from the sampling points assigned to each node pair in the network;
    for a flow associated with each node pair in the network, obtaining sampled traffic flow counts from the diagnostic traffic data collected from the sampling point subset assigned to; and
    for each flow, performing a function on the respective sampled traffic flow counts to obtain an estimated traffic flow count for the flow.

12. The non-transitory medium of claim 11, wherein the flow is a specific traffic flow associated with the node pair.

13. The non-transitory medium of claim 11, wherein the flow is a total traffic flow associated with the node pair.

14. The non-transitory medium of claim 11, wherein the method further comprises
    generating a data traffic matrix containing the estimated traffic flow counts.

15. The non-transitory medium of claim 11, wherein the sampling point subset is assigned to the node pair based on historical traffic data.

16. The non-transitory medium of claim 11, further comprising determining sampling points most likely to monitor all data traffic associated with the node pair, wherein the determined sampling points are included within the sampling point subset.

17. The non-transitory medium of claim 11, wherein the function is a combinatory function.

18. The non-transitory medium of claim 17, wherein each sampling point has a sampling probability, and the combinatory function comprises dividing the sum of the sampled traffic flow counts by the sum of the sampling probabilities.

19. The non-transitory medium of claim 11, wherein the estimated traffic flow count is one of an estimated data packet count, an estimated byte count, and an estimated connection count.

20. The non-transitory medium of claim 11, wherein the method further comprises deriving a node-specific estimated traffic count for a node of the node pair at least partially from the estimated traffic flow count.

21. A method of monitoring traffic within a network of nodes, comprising:
    assigning a plurality of network traffic sampling points to a source node and a destination node; said plurality of sampling points distributed throughout the network; said sampling points adapted to provide diagnostic network traffic data comprising a source address and a destination address; even if said flow passes more than one sampling point;
    collecting diagnostic network traffic data from the sampling points;

obtaining sampled traffic flow counts for a flow associated with the source and destination nodes from the diagnostic traffic data collected from the sampling points; and performing a combinatory function on the sampled traffic flow counts to obtain an estimated traffic flow count for the flow.

22. The method of claim 21, wherein the flow is a specific traffic flow associated with the source node and destination node.

23. The method of claim 21, wherein the flow is a total traffic flow associated with the source node and destination node.

24. The method of claim 21, further comprising:
assigning network traffic sampling points to the nodes;
for a flow associated with each unique pair of nodes, obtaining sampled traffic flow counts from the diagnostic traffic data collected from the sampling points assigned to source and destination nodes of the respective node pair;
for each flow, performing a function on the respective sampled traffic flow counts to obtain an estimated traffic flow count; and
generating a data traffic matrix containing the estimated traffic flow counts.

25. The method of claim 21, wherein the sampling points are assigned to the source and destination nodes as individual nodes.

26. The method of claim 21, wherein the sampling points are assigned to the source and destination nodes as a unique node pair.

27. The method of claim 21, wherein the sampling points are assigned to the source and destination nodes based on historical traffic data.

28. The method of claim 21, further comprising determining sampling points most likely to monitor all data traffic associated with the source and destination nodes, wherein the determined sampling points are the assigned sampling points.

29. The method of claim 21, wherein each sampling point has a sampling probability, and the combinatory function comprises dividing the sum of the sampled traffic flow counts by the sum of the sampling probabilities.

30. The method of claim 21, wherein the estimated traffic flow count is one of an estimated data packet count, an estimated byte count, and an estimated connection count.

31. A non-transitory medium carrying a computer program having instructions that, when executed, perform a method of monitoring traffic within a network of nodes, comprising:
assigning a plurality of network traffic sampling points to a source node and a destination node; said plurality of sampling points being distributed throughout the network; said sampling points adapted to provide diagnostic network traffic data comprising a source address and a destination address; even if said flow passes more than one sampling point;
collecting diagnostic network traffic data from the sampling points;
obtaining sampled traffic flow counts for a flow associated with the source and destination nodes from the diagnostic traffic data collected from the sampling points; and
performing a combinatory function on the sampled traffic flow counts to obtain an estimated traffic flow count for the flow.

32. The non-transitory medium of claim 31, wherein the flow is a specific traffic flow associated with the source node and destination node.

33. The non-transitory medium of claim 31, wherein the flow is a total traffic flow associated with the source node and destination node.

34. The non-transitory medium of claim 31, wherein the method further comprises:
assigning network traffic sampling points to the nodes;
for a flow associated with each unique pair of nodes, obtaining sampled traffic flow counts from the diagnostic traffic data collected from the sampling points assigned to source and destination nodes of the respective node pair;
for each flow, performing a function on the respective sampled traffic flow counts to obtain an estimated traffic flow count; and
generating a data traffic matrix containing the estimated traffic flow counts.

35. The non-transitory medium of claim 31, wherein the sampling points are assigned to the source and destination nodes as individual nodes.

36. The non-transitory medium of claim 31, wherein the sampling points are assigned to the source and destination nodes as a unique node pair.

37. The non-transitory medium of claim 31, wherein the sampling points are assigned to the source and destination nodes based on historical traffic data.

38. The non-transitory medium of claim 31, wherein the method further comprises determining sampling points most likely to monitor all data traffic associated with the source and destination nodes, wherein the determined sampling points are the assigned sampling points.

39. The non-transitory medium of claim 31, wherein each sampling point has a sampling probability, and the combinatory function comprises dividing the sum of the sampled traffic flow counts by the sum of the sampling probabilities.

40. The non-transitory medium of claim 31, wherein the estimated traffic flow count is one of an estimated data packet count, an estimated byte count, and an estimated connection count.

41. A method of monitoring traffic within a network of nodes, comprising:
obtaining historical network traffic data over a plurality of network traffic sampling points; said plurality of sampling points being distributed throughout the network; said sampling points adapted to provide diagnostic network traffic data comprising a source address and a destination address; even if said flow passes more than one sampling point;
assigning sampling points to the nodes based on the historical traffic data;
obtaining sampled traffic flow counts for a flow associated with the source and destination nodes of a unique pair of nodes from the diagnostic traffic data collected from the sampling points assigned to the source and destination nodes; and
performing a function on the sampled traffic flow counts to obtain an estimated traffic flow count for the flow.

42. The method of claim 41, further comprising determining sampling points most likely to monitor all data traffic associated with a node or unique node pair, wherein the determined sampling points are assigned to the node or node pair.

43. The method of claim 41, wherein the sampling points are assigned to the nodes as individual nodes.

44. The method of claim 41, wherein the sampling points are assigned to the nodes as unique node pairs.

45. A non-transitory medium carrying a computer program having instructions that, when executed, perform a method of monitoring traffic within a network of nodes, comprising:
  obtaining historical network traffic data over a plurality of network traffic sampling points; said plurality of sampling points being distributed throughout the network; said sampling points adapted to provide diagnostic network traffic data comprising a source address and a destination address even if the flow data passes more than one sampling point;
  assigning sampling points to the nodes based on the historical traffic data;
  obtaining sampled traffic flow counts for a flow associated with source and destination nodes of a unique pair of nodes from the diagnostic traffic data collected from the sampling points assigned to the source and destination nodes; and
  performing a function on the sampled traffic flow counts to obtain an estimated traffic flow count for the flow.

46. The non-transitory medium of claim 45, wherein the sampling points are assigned to the nodes as unique node pairs.

47. The non-transitory medium of claim 45, wherein the method further comprises determining sampling points most likely to monitor all data traffic associated with a node or unique node pair, wherein the determined sampling points are assigned to the node or node pair.

48. The non-transitory medium of claim 45, wherein the sampling points are assigned to the nodes as individual nodes.

49. A non-transitory medium carrying a computer program having instructions that, when executed, perform a method of monitoring traffic within a network of nodes, comprising:
  determining network traffic sampling points distributed throughout the network; said sampling points adapted to provide diagnostic network traffic flow comprising a source address and a destination address even if the traffic passes more than one sampling point; and most likely to monitor traffic associated with a source node and a destination node;
  assigning the sampling points to the source and destination nodes;
  obtaining sampled traffic flow counts for a flow associated with the source and destination nodes from the diagnostic traffic data collected from the sampling points assigned to the source and destination nodes; and
  performing a function on the sampled traffic flow counts to obtain an estimated traffic flow count for the flow.

50. The non-transitory medium of claim 49, wherein a source subset of sampling points is determined to be most likely to monitor traffic associated with the source node, and a destination subset of sampling points is determined to be most likely to monitor traffic associated with the destination node, and the source and destination sampling point subsets are respectively assigned to the source and destination nodes.

51. The non-transitory medium of claim 49, wherein the sampling points are determined to be most likely to monitor traffic associated with the source and destination nodes as a unique node pair, and the sampling points are assigned to the unique node pair.

52. The non-transitory medium of claim 49, wherein the determined sampling points are most likely to monitor all traffic associated with the source and destination nodes.

53. A method of monitoring traffic within a network of nodes, comprising:
  automatically determining network traffic sampling points distributed throughout the network; said sampling points adapted to provide diagnostic network traffic data comprising a source address and a destination address even if the flow data passes more than one sampling point, most likely to monitor traffic associated with a source node and a destination node; and
  automatically assigning the sampling points to the source and destination nodes;
  obtaining sampled traffic flow counts for a flow associated with the source and destination nodes from the diagnostic traffic data collected from the sampling points assigned to the source and destination nodes; and
  performing a function on the sampled traffic flow counts to obtain an estimated traffic flow count for the flow.

54. The method of claim 53, wherein the sampling points are determined to be most likely to monitor traffic associated with the source and destination nodes as a unique node pair, and the sampling points are assigned to the unique node pair.

55. The method of claim 53, wherein the determined sampling points are most likely to monitor all traffic associated with the source and destination nodes.

56. The method of claim 53, wherein a source subset of sampling points is determined to be most likely to monitor traffic associated with the source node, and a destination subset of sampling points is determined to be most likely to monitor traffic associated with the destination node, and the source and destination sampling point subsets are respectively assigned to the source and destination nodes.

* * * * *